United States Patent [19]

Ando

[11] Patent Number: 5,109,279
[45] Date of Patent: Apr. 28, 1992

[54] TELEVISION RECEIVER WITH TELETEXT RECIEVING FUNCTION AND A METHOD FOR SUPERIMPOSING A TELETEXT PICTURE ON A TELEVISION PICTURE

[75] Inventor: Morio Ando, Gyoda, Japan

[73] Assignee: Kabushiki Kaisha Toshiba, Kawasaki, Japan

[21] Appl. No.: 329,398

[22] Filed: Mar. 27, 1989

[30] Foreign Application Priority Data

Mar. 28, 1988 [JP] Japan ................... 63-75363

[51] Int. Cl.⁵ ......................................... H04N 7/087
[52] U.S. Cl. ................................... 358/147; 358/183
[58] Field of Search ............... 358/147, 142, 146, 183, 358/22, 140

[56] References Cited

U.S. PATENT DOCUMENTS

| 51,846 | 3/1987 | Osawa | 358/147 |
|---|---|---|---|
| 4,204,227 | 5/1980 | Gurley | 358/183 |
| 4,233,628 | 11/1980 | Ciciora | 358/147 |
| 4,633,297 | 12/1986 | Skerlos | 358/22 |
| 4,729,028 | 3/1988 | Micic et al. | 358/183 |
| 4,750,039 | 6/1988 | Willis | 358/183 |
| 4,796,089 | 1/1989 | Imai | 358/183 |

FOREIGN PATENT DOCUMENTS

| 0129648 | 1/1985 | European Pat. Off. |
|---|---|---|
| 0229526 | 7/1987 | European Pat. Off. |
| 2812549 | 3/1987 | Fed. Rep. of Germany |
| 39100529 | 7/1990 | Fed. Rep. of Germany |
| 1576047 | 10/1980 | United Kingdom |
| 2062401 | 5/1981 | United Kingdom |
| 2165719 | 4/1986 | United Kingdom |
| 2187360 | 9/1987 | United Kingdom |

Primary Examiner—James J. Groody
Assistant Examiner—David E. Harvey
Attorney, Agent, or Firm—Cushman, Darby & Cushman

[57] ABSTRACT

Teletext data stored in a video RAM is developed in a work RAM. A CPU selectively deletes picture elements from the developed teletext data, to thereby compress the teletext data into data adapted for display in an auxiliary screen which is e.g., ¼ of the display screen of a CRT. The compressed teletext data is written into the video RAM. A display controller supplies the compressed teletext data stored in the video RAM to a synthesizing circuit, together with an appropriate display switching signal representing a timing for switching between the compressed teletext data and a TV broadcast video signal. In accordance with the display switching signal, the synthesizing circuit selectively supplies the TV broadcast video signal and the compressed teletext data to a video output circuit. Accordingly, the teletext picture compressed to a ¼ size is displayed on the display screen of the CRT as an auxiliary screen image, while being superimposed on the TV picture.

6 Claims, 8 Drawing Sheets

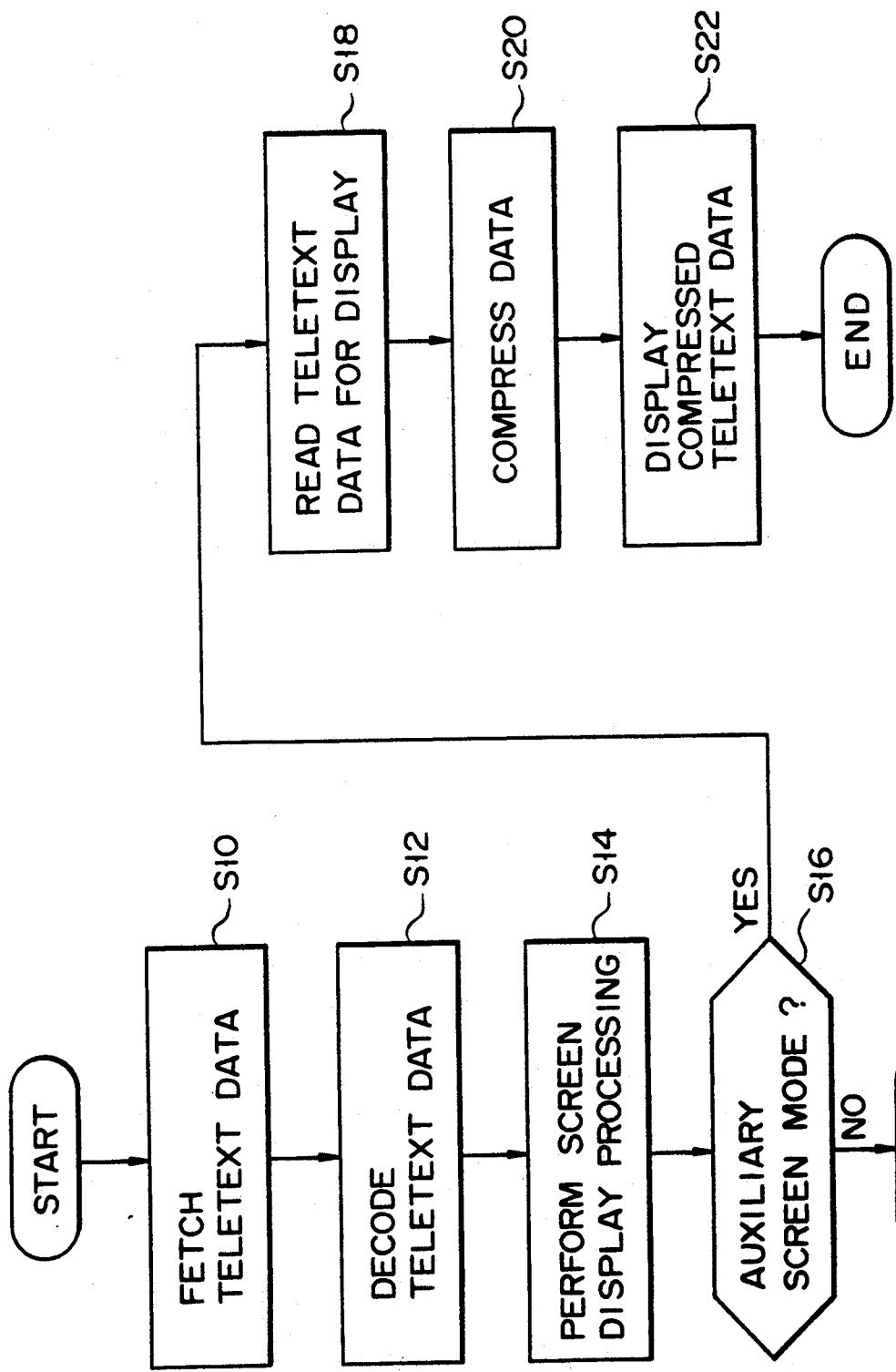
F I G. 2

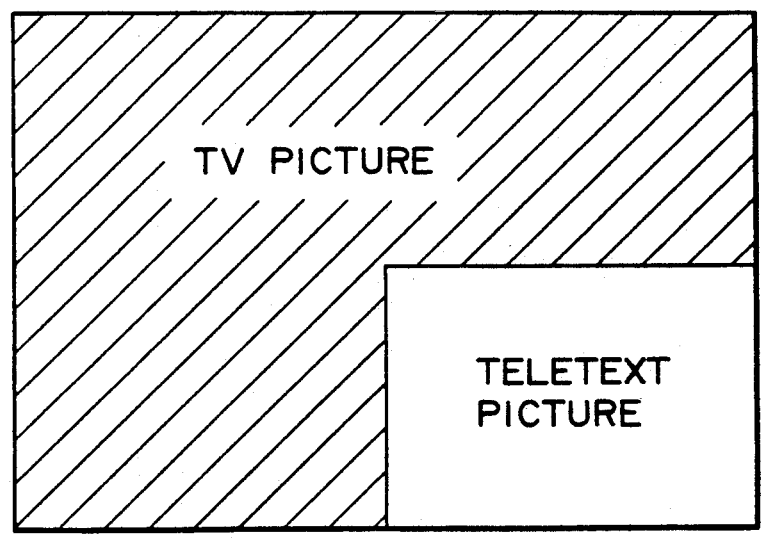
F I G. 3
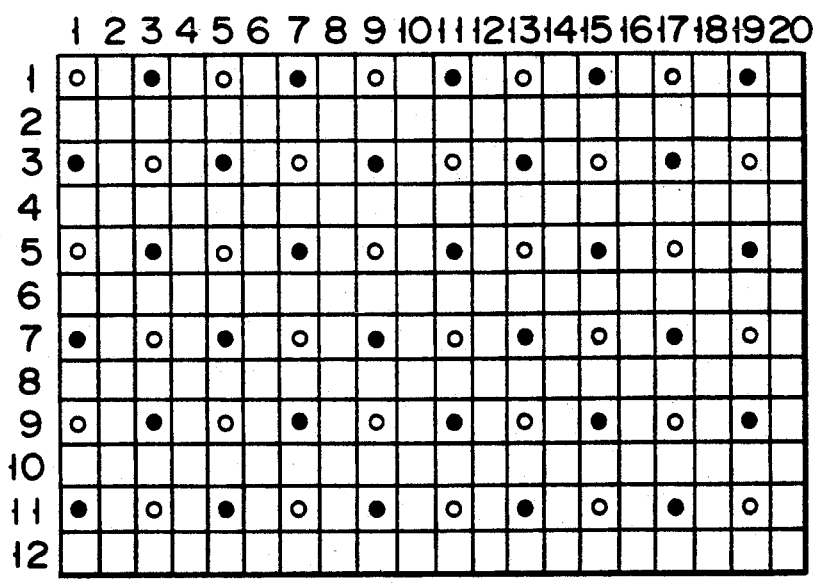
F I G. 4A
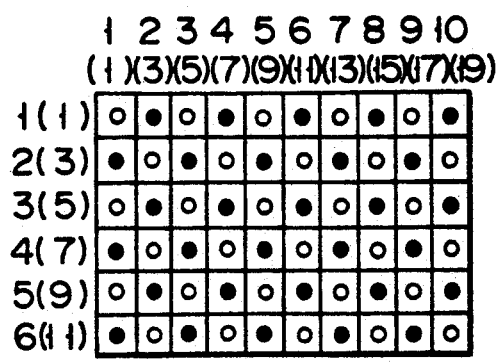
F I G. 4B

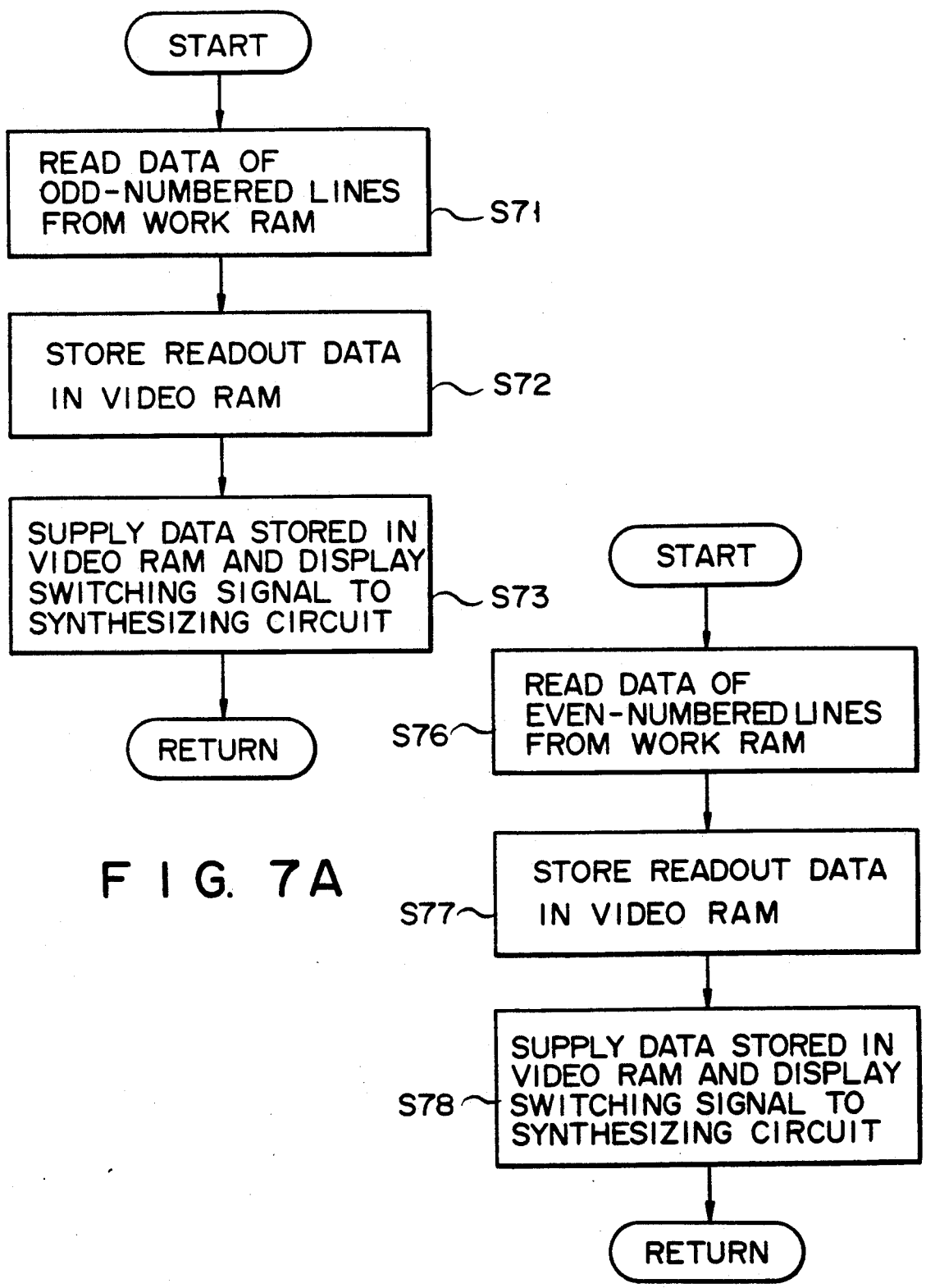
F I G. 7A
F I G. 7B

TELEVISION RECEIVER WITH TELETEXT RECIEVING FUNCTION AND A METHOD FOR SUPERIMPOSING A TELETEXT PICTURE ON A TELEVISION PICTURE

BACKGROUND OF THE INVENTION

1. Field of the Invention

The present invention relates to a television receiver having the teletext receiving function, i.e., a function of displaying teletext pictures corresponding to teletext signals superimposed in the vertical blanking period of television signals. The present invention also relates to a method for superimposing a teletext picture on a television picture.

2. Description of the Related Art

A character broadcasting system generally referred to as a teletext is currently available. According to this character broadcasting system, a television (TV) broadcasting station superimposes coded character data on a TV signal during a predetermined horizontal scanning period of a vertical blanking period of the TV signal and transmits the coded character data together with the TV signal. A TV signal receiving station (i.e., a TV receiver) picks up the coded character data and decodes it into original character data for viewing on the TV screen.

A TV broadcasting station transmits a plurality of character broadcast programs by superimposing them in a plurality of horizontal scanning periods of the TV signal. Therefore, a user or viewer first selects the channel through which the character broadcast program he or she wants to view is transmitted by operating key input means, such as a remote control hand set, and then designates the program number corresponding to the character broadcast program by operating the key input means, thereby viewing on the TV screen a teletext picture corresponding to the character broadcast program.

However, in a conventional TV receiver having a teletext receiving function, which allows the above teletext picture to be displayed on the TV screen, the TV display mode must be first switched to the teletext display mode, so as to monitor the character broadcast program. Therefore, when the user is viewing the teletext picture, he or she cannot know what information is displayed on the TV picture. Conversely, when the user is viewing the TV picture, he or she cannot know the information displayed on the teletext picture. In the conventional TV receiver, therefore, the teletext picture cannot be displayed on the TV screen without switching the mode from the TV display mode to the teletext display mode; the conventional TV receiver does not permit the user to view both the teletext picture and the ordinary TV picture at the same time.

SUMMARY OF THE INVENTION

Accordingly, an object of the present invention is to provide a television receiver with a teletext receiving function, which enables both a teletext picture and a television picture to be viewed at the same time by superposing them on each other. Another object of the invention is to provide a superimposing method for superimposing a teletext picture on a television picture.

To achieve the first object, the present invention provides a television receiver which comprises signal receiving means for receiving a television broadcast signal including teletext data, television picture information pickup means for picking up television picture information from the television broadcast signal received by the signal receiving means, display means for displaying the television picture information picked up by the television picture information pickup means, teletext data pickup means for picking up the teletext data from the television broadcast signal received by the signal receiving means, storing means for temporarily storing the teletext data picked up by the teletext data pickup means, compression means for selectively compressing the teletext data stored in the storing means, and display control means for replacing part of the television picture information displayed on the display means with the teletext data compressed by the compressing means, whereby the teletext data is displayed on the display means as an auxiliary screen image, together with the television picture information.

To achieve the second object, the present invention provides a method for superimposing a teletext picture on a television picture, comprising the steps of receiving a television broadcast signal including teletext data, picking up television picture information from a received television broadcast signal, displaying a television picture corresponding to the television picture information, picking up the teletext data from the received television broadcast signal, temporarily storing the teletext data, compressing a stored teletext data by selective deletion, and superimpressing a teletext picture corresponding to compressed teletext data on the television picture by replacing part of the television picture with the teletext picture.

BRIEF DESCRIPTION OF THE DRAWINGS

FIG. 2 is a flow chart illustrating the processings performed by a CPU shown in FIG. 1 for explaining the operation of the circuit shown in FIG. 1;

FIG. 3 is a view showing an example of the manner in which image display is performed;

FIGS. 4A and 4B are views illustrating the first data compression method used in the present invention, more particularly, FIG. 4A showing the display condition before the data compression, and FIG. 4B showing the display condition after the data compression;

FIG. 7A is a flow chart illustrating how the first field screen-switching processing routine included in the flow chart of FIG. 6 are performed, and FIG. 7B is a flow chart illustrating how the second field screen-switching processing routine included in the flow chart of FIG. 6 are performed;

DETAILED DESCRIPTION OF THE PREFERRED EMBODIMENTS

The present invention will now be described in detail with reference to the accompanying drawings.

Figure 1:
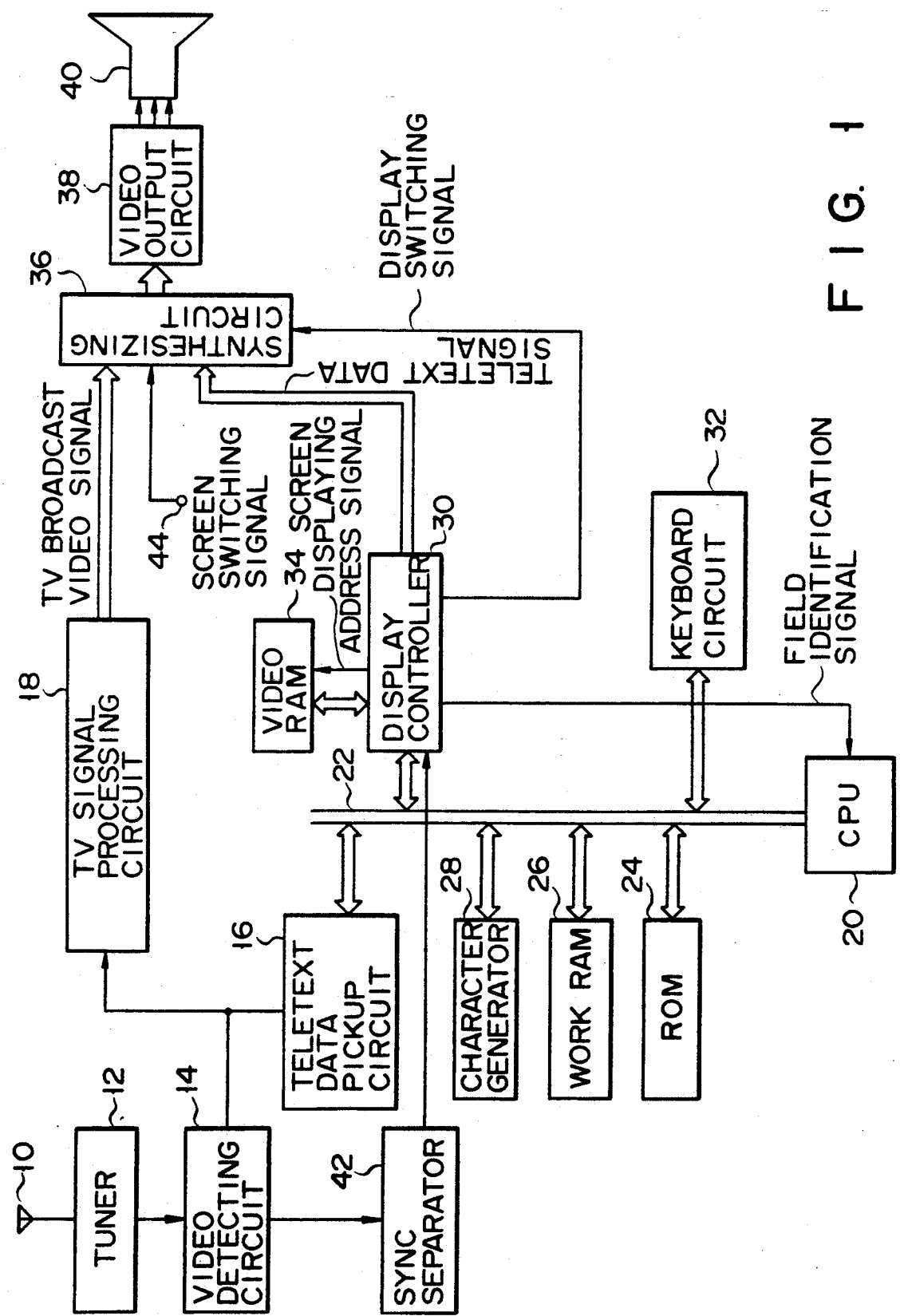
FIG. 1 is a block circuit diagram showing a television receiver with a teletext receiving function according to one embodiment of the present invention.

In the circuit shown in FIG. 1, a television (TV) broadcast signal with superimposed teletext data including a teletext program which the user desires to view is received by TV broadcast signal receiving antenna 10 and is tuned by tuner 12. After being tuned, the TV broadcast signal is supplied to video detecting circuit 14 for video detection. A demodulated video signal output from video detecting circuit 14 is supplied to teletext data pickup circuit 16, by which teletext broadcast data is picked up from the demodulated video signal in the order of transmission. The demodulated video signal output from video detecting circuit 14 is also supplied to TV signal processing circuit 18, which is of a well-known type.

Teletext data pickup circuit 16 comprises a buffer memory for temporarily storing the picked-up teletext broadcast data. Teletext data pickup circuit 16 is connected to microcomputer (hereinafter referred to as a CPU) 20 through bus line 22. In addition to teletext data pickup circuit 16, the following are also connected to CPU 20 through bus line 22: ROM 24 for storing a program for displaying the teletext broadcast data; work RAM 26; character generator 28 for generating a character on the basis of the code included in the teletext broadcast data; display controller 30; and keyboard circuit 32. Keyboard circuit 32 includes various kinds of key switches and generates a signal corresponding to an operated key switch. Needless to say, keyboard circuit 32 may be replaced with a circuit which receives an operation signal transmitted by key input means, such as a remote control hand set, and generates a signal corresponding to the received operation signal.

Display controller 30 stores an image data of characters successively generated by character generator 28 into video RAM 34. This RAM 34 is adapted to store teletext broadcast data. Display controller 30 also reads the teletext broadcast data out of video RAM 34 and supplies it to synthesizing circuit 36. More specifically, display controller 30 reads the teletext broadcast data by driving video RAM 34 on the basis of a screen displaying address and sends it to synthesizing circuit 36. Further, display controller 30 sends a display switching signal to synthesizing circuit 36.

The teletext broadcast data signal supplied from display controller 30 and the signal supplied from TV signal processing circuit 18 are selectively output from synthesizing circuit 36 in accordance with the display switching signal, whereby the signals are synthesized with each other. The synthesized signal is supplied to video output circuit 38. This video output circuit produces a video signal, which includes auxiliary screen (i.e. teletext picture) information associated with the teletext broadcast data synthesized by synthesizing circuit 36, and supplies the video signal to CRT 40. Display controller 30 prepares a teletext picture display clock by use of a sync signal, which is supplied from sync separator 42 employed for separating the sync signal from the video detection output of video detecting circuit 14.

A description will now be given as to how the above TV receiver operates, with reference to the flow chart shown in FIG. 2 (in which the processings performed by CPU 20 are explained). First of all, CPU 20 causes teletext data pickup circuit 16 to fetch the data of the teletext broadcast program corresponding to the program number data supplied from keyboard circuit 32 (step S10). Specifically, CPU 20 checks the data which is stored in the buffer memory by teletext data pickup circuit 16, on the basis of the program number data supplied from keyboard circuit 32, thereby searching for the teletext broadcast data of the teletext broadcast program corresponding to the program number data. If the teletext broadcast data searched for is found, it is decoded according to the program stored in ROM 24 (step S12). Specifically, CPU 20 causes character generator 28 to generate characters corresponding to the fetched teletext broadcast data, thereby developing the teletext broadcast data into data adapted for display.

Next, screen display processings are performed (step S14). In the processings, the teletext broadcast data is transferred to display controller 30, where it is written into video RAM 34.

In display controller 30, it is determined whether the TV receiver is set in the auxiliary screen display mode (step S16). If it is determined that the apparatus is not set in the auxiliary screen display mode, then display controller 30 supplies the screen displaying address signal to video RAM 34 in synchronism with a raster scan, so as to supply the teletext broadcast data signal to synchronizing circuit 36. At this time, synthesizing circuit 36 is set in the mode for selecting and outputting the teletext broadcast data since, during the normal display mode, circuit 36 receives a screen switching signal supplied from keyboard circuit 32 through terminal 44. Therefore, synthesizing circuit 36 supplies the teletext broadcast data signal to video output circuit 32. As a result, the teletext broadcast program selected by the key operation at keyboard circuit 32 is displayed on the display screen of CRT 40.

In the case where a TV broadcast signal is displayed, the screen switching signal supplied to terminal 44 is a signal that causes synthesizing circuit 36 to select and output the TV broadcast video signal supplied from TV signal processing circuit 18. Therefore, synthesizing circuit 36 supplies the selected T broadcast video signal to the screen of CRT 40 through the video output circuit 38.

A description will now be given as to how the teletext broadcast data is displayed in the auxiliary display screen. When a signal causing the teletext broadcast data to be displayed in the auxiliary display screen is supplied to CPU 20 from keyboard circuit 32, CPU 20 decodes this data, for establishing the auxiliary screen display mode. Where the auxiliary screen display mode is set in step S16, CPU 20 performs the processings for reading the teletext broadcast data (step S18). That is, CPU 20 supplies a read control signal to display controller 30. Therefore, display controller 30 reads the teletext broadcast data from video RAM 34 and transfers the data into work RAM 26.

After the teletext broadcast data is transferred into work RAM 26, CPU 20 selectively deletes the teletext broadcast data, whereby the data is compressed (step S20). In this manner, the teletext broadcast data is processed into data adapted for display in the auxiliary display screen and therefore can be displayed in the auxiliary display screen which is ¼ or ½ of the normal display screen.

After preparing the compressed teletext broadcast data, which is adapted for display in the auxiliary display screen, CPU 20 performs processings for displaying the compressed teletext broadcast data (step S22). Specifically, the compressed teletext data is transferred to display controller 30. Display controller 30 stores the compressed teletext data in video RAM 34. Thereafter, display controller 30 supplies the compressed teletext broadcast data signal from video RAM 34 to synthesizing circuit 36. At this time, a display switching signal, i.e., a timing signal permitting the compressed teletext data signal to be displayed in accordance with the raster scan of the TV broadcast signal, is also supplied to synthesizing circuit 36. In this fashion, the teletext broadcast program (teletext picture) is displayed as auxiliary screen data, together with the TV broadcast program (TV picture) displayed on the TV broadcast screen.

FIG. 3 shows an example of the screen on which the teletext picture is shown as auxiliary screen data. As is shown in FIG. 3, the teletext picture is displayed in the lower right quadrant of the TV picture displayed in the TV display screen (i.e., a main screen). In the case shown in FIG. 3, the teletext picture is displayed such that it occupies ¼ of the entire TV picture. Needless to say, the teletext picture can be displayed in the main screen, with the TV picture displayed on the auxiliary screen. The position of the auxiliary display screen can be freely determined by simply causing display controller 30 to output appropriately the compressed teletext broadcast data signal and an appropriate display switching signal. In addition, the main screen can be divided into four quadrants, for displaying four teletext broadcast programs, respectively.

A description will now be given as to how the selective deletion of data (i.e., data compression) is performed for permitting the teletext broadcast data adapted for display to be displayed in the auxiliary screen.

FIGS. 4A and 4B illustrate the first data compression method used in the present invention. Let it be assumed that teletext broadcast data is displayed on a TV screen having twelve rasters and twenty picture elements aligned in the horizontal direction, as is shown in FIG. 4A. As a result of the data compression, the teletext broadcast data is compressed in the manner shown in FIG. 4B. As can be understood from FIGS. 4A and 4B, the image data after the data compression is obtained by selecting every second picture element in both the horizontal and vertical directions from the image data before the data compression. More specifically, the first picture element data of the first line of the original image data is shown as the first picture element data of the first line of the compressed image data, the seventh picture element data of the third line of the original image data is shown as the fourth picture element of the second line of the compressed image data, and so on.

Figure 5A:
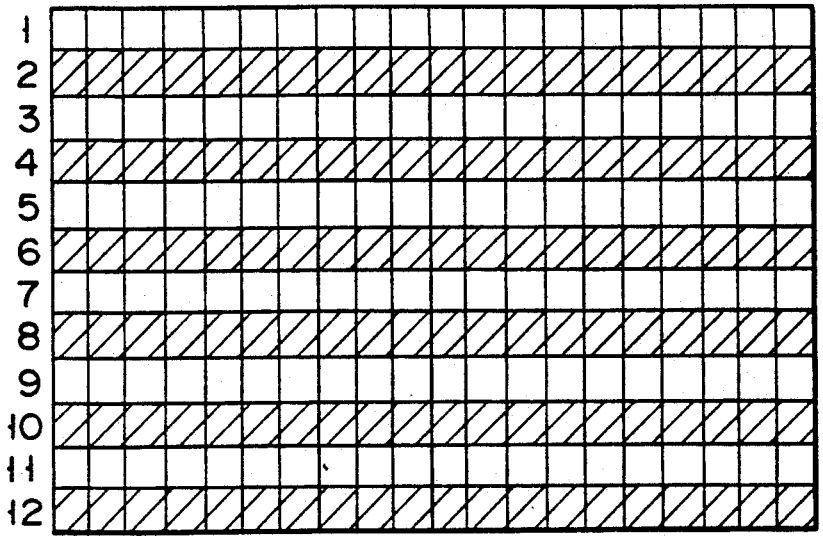
FIGS. 5A to 5C are views illustrating the second data compression method used in the present invention, more particularly, FIG. 5A showing the display condition before the data compression, FIG. 5B showing the display condition at the first field after the data compression, and FIG. 5C showing the display condition at the second field after the data compression.
Figure 5B:
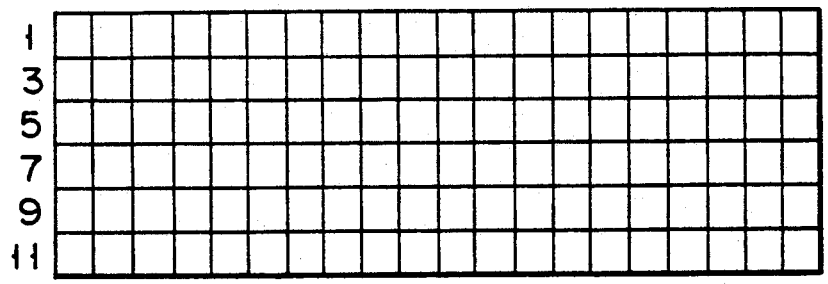
Figure 5C:
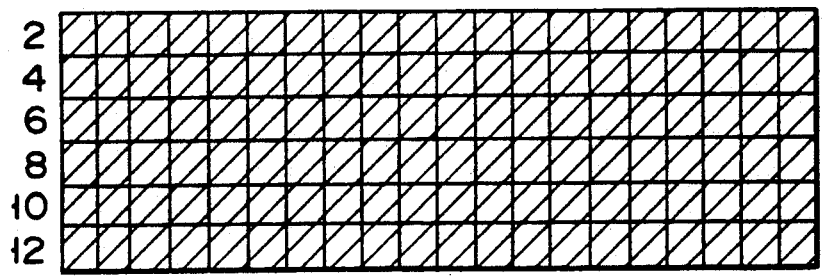

FIGS. 5A to 5C illustrate the second data compression method used in the present invention. FIG. 5A shows a screen condition before the data compression, and FIGS. 5B and 5C show screen conditions obtained after the data compression. The screen shown in FIG. 5A is equal in size to that shown in FIG. 4A, so that it has twelve rasters and twenty picture elements aligned in the horizontal direction. In FIG. 5A, the odd-numbered lines (i.e., the first line, third line, fifth line, ...) represent the first field of data, and the even-numbered lines (i.e., the second line, fourth line, sixth line, ...) represent the second field data. According to the second data compression method, the first and second fields of data are alternately displayed on the TV display screen, so that the image data can be compressed without losing any of the first and second fields. Specifically, the image shown in FIG. 5B is displayed in the first field period, and the image shown in FIG. 5C is displayed in the second field period. Therefore, the original image data can be compressed such that its size is reduced to half in the vertical direction.

Figure 6:
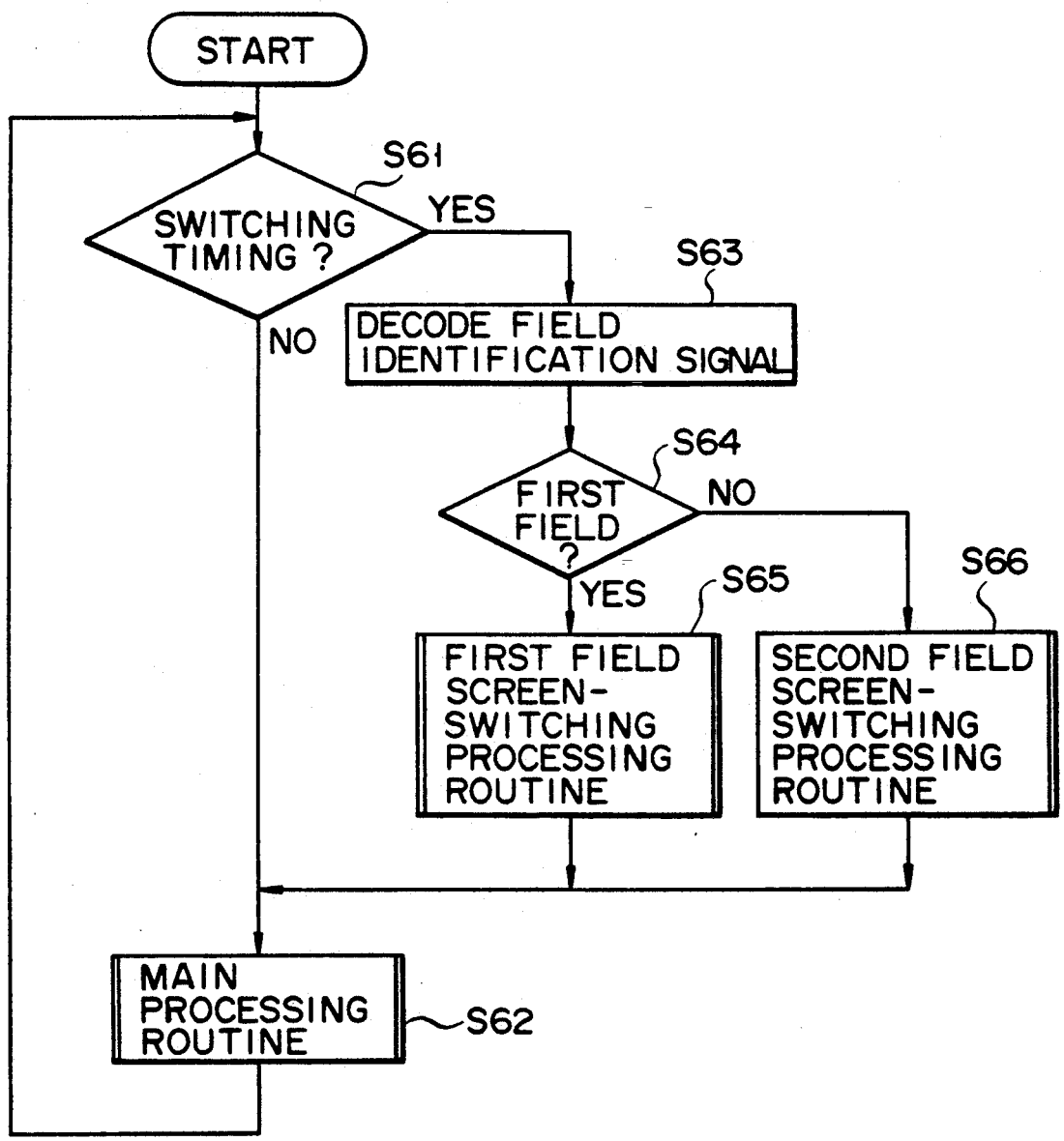
FIG. 6 is a flow chart illustrating the field switching operation performed for carrying out the data compression shown in FIGS. 5A to 5C.

The field switching processings performed for displaying the above compressed data will now be described, with reference to the flow chart shown in FIG. 6. First of all, it is determined whether or not the time is appropriate for switching (step S61). This determination of the switching timing is performed based on the detection of a vertical sync signal supplied from sync separator 42. If the vertical sync signal is not detected (i.e., "NO" is step S61), normal display processings (i.e., the main processing routine) are performed (step S62), so that the teletext broadcast data is stored in video RAM 34 and one field of data is displayed in the auxiliary display screen. If the vertical sync signal is detected, (i.e., "YES" in step S61), display controller 30 supplies the field identification signal to CPU 20, for the decoding of the field identification signal (step S63). As is shown in FIG. 1, the field identification signal is supplied directly to CPU 20.

By decoding the field identification signal, CPU 20 determines whether the field is the first one or the second one (step S64). If the field is determined to be the first one, the first field screen-switching processing routine is executed (step S65), thereby displaying the first field of data in the auxiliary display screen, as is shown in FIG. 5B. If the field is determined to be the second one, the second field screen-switching processing routine is executed (step S66), thereby displaying the second field of data in the auxiliary display screen, as is shown in FIG. 5C. After displaying the compressed data in this fashion, the main processing routine is executed (step S62), and then the flow returns to step S61 for determining once again whether or not the time is appropriate for switching.

FIG. 7A is a flow chart explaining the first field screen-switching processing routine performed in step S65. As is shown in FIG. 7A, CPU 20 reads only the teletext broadcast data of the odd-numbered lines from the teletext broadcast data stored in work RAM 26, and transfers the read data to display controller 30 (step S71). Display controller 30 stores the data of the odd-numbered lines in video RAM 34 (step S72). Then display controller 30 supplies the compressed teletext broadcast data stored in video RAM 34 to synthesizing circuit 36, together with the appropriate display switching signal (step S73).

FIG. 7B is a flow chart explaining the second field screen-switching processing routine performed in step S66. As is shown in FIG. 7B, CPU 20 reads only the teletext data of the even-numbered lines from the teletext broadcast data stored in work RAM 26, and transfers the read data to display controller 30 (step S76). Display controller 30 stores the data of the even-numbered lines in video RAM 34 (step S77). Then, display controller 30 supplies the compressed teletext broadcast data stored in video RAM 34 to synthesizing circuit 36, together with the appropriate display switching signal (step S78).

Figure 8A:
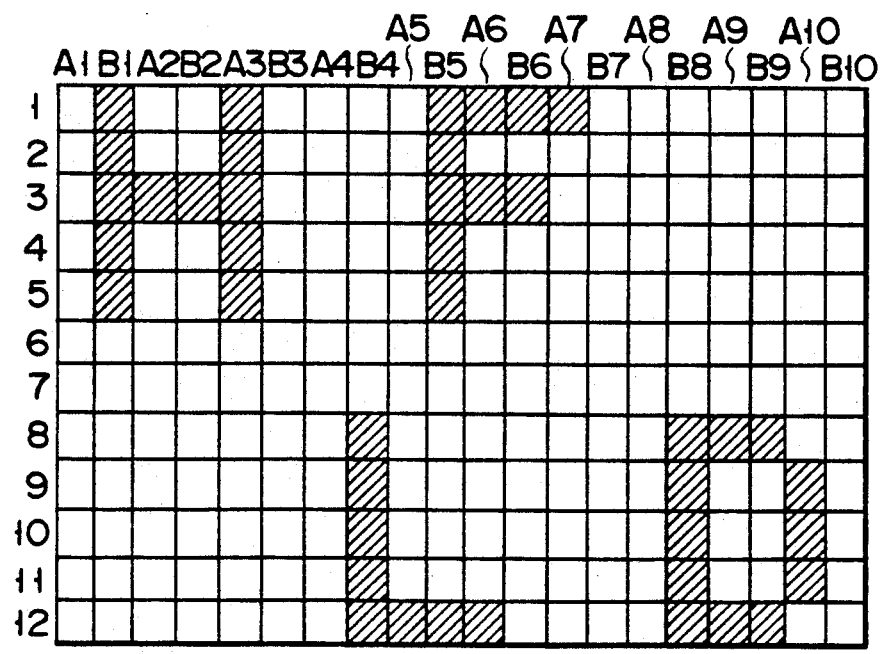
FIGS. 8A and 8B are views illustrating the third data compression method used in the present invention, FIG. 8A showing the display condition before the data compression while FIG. 8B showing the display condition after the data compression.
Figure 8B:
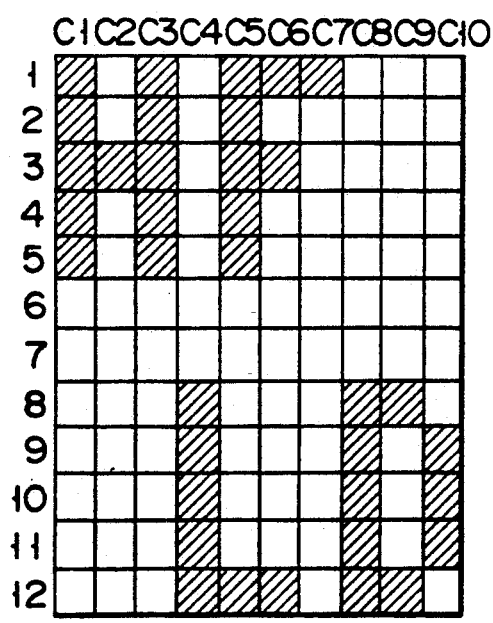

According to the second compression method mentioned above, the compressed teletext broadcast data is displayed in either the upper or lower half of the TV screen. Since, in this case, the teletext broadcast data cannot be displayed with a scale of ¼, the third compression method shown in FIGS. 8A and 8B is used in conjunction with the second compression method. FIG. 8A shows a screen which has twelve rasters and twenty picture elements aligned in the horizontal direction, like the screens shown in FIGS. 4A and 5A, and FIG. 8B shows a compressed image displayed on the screen of FIG. 8A. As is shown in FIG. 8A, characters "H", "F", "L", and "D" are indicated by means of predetermined display blocks. To compress this image data into that shown in FIG. 8B, the logical sum between an even-numbered vertical picture element row and its adjacent odd-numbered vertical picture element row is detected. More specifically, the logical sums between rows A1 and B1, between rows A2 and B2, between rows A3 and B3, between rows A4 and B4, between rows A5 and B5, between rows A6 and B6, between rows A7 and B7, between rows A8 and B8, between rows A9 and B9, and between rows A10 and B10 are detected. Image data obtained on the basis of these logical sums is used as image data for producing a compressed image.

In FIG. 8B, picture element row C1 is the row obtained on the basis of the logical sum between picture element rows A1 and B1 shown in FIG. 8A, and picture element row C2 is the row obtained on the basis of the logical sum between picture element rows A2 and B2 shown in FIG. 8A. Likewise, row C3 corresponds to the logical sum between A3 and B3; row C4 to that between A4 and B4 row C5 to that between A5 and B5; row C6 to that between A6 and B6; row C7 to that between A7 and B7; row C8 to that between A8 and B8; row C9 to that between A9 and B9; and row C10 to that between A10 and B10.

The image data produced on the basis of the above logical sums will be explained in more detail. In FIG. 8A, first picture element A1 of the first line is a blank portion (which is not part of a character), and its adjacent picture element B1 is an oblique line portion (which is part of a character). If first and second picture elements A1 and B1 are treated as logical "0" and logical "1", respectively, their logical sum is "1", so that picture element data of logical "1" is displayed in first picture element C1 of the first line of the compressed screen, as is indicated by the oblique line portion in FIG. 8B. Likewise, the logical sum between picture elements A2 and B2 of the third line shown in FIG. 8A is "1", so that picture element data of logical "1" (which picture element data constituting the central line of character "H") is displayed in second picture element C2 of the third line of the compressed screen, as is indicated by the oblique lines in FIG. 8B.

Figure 9:
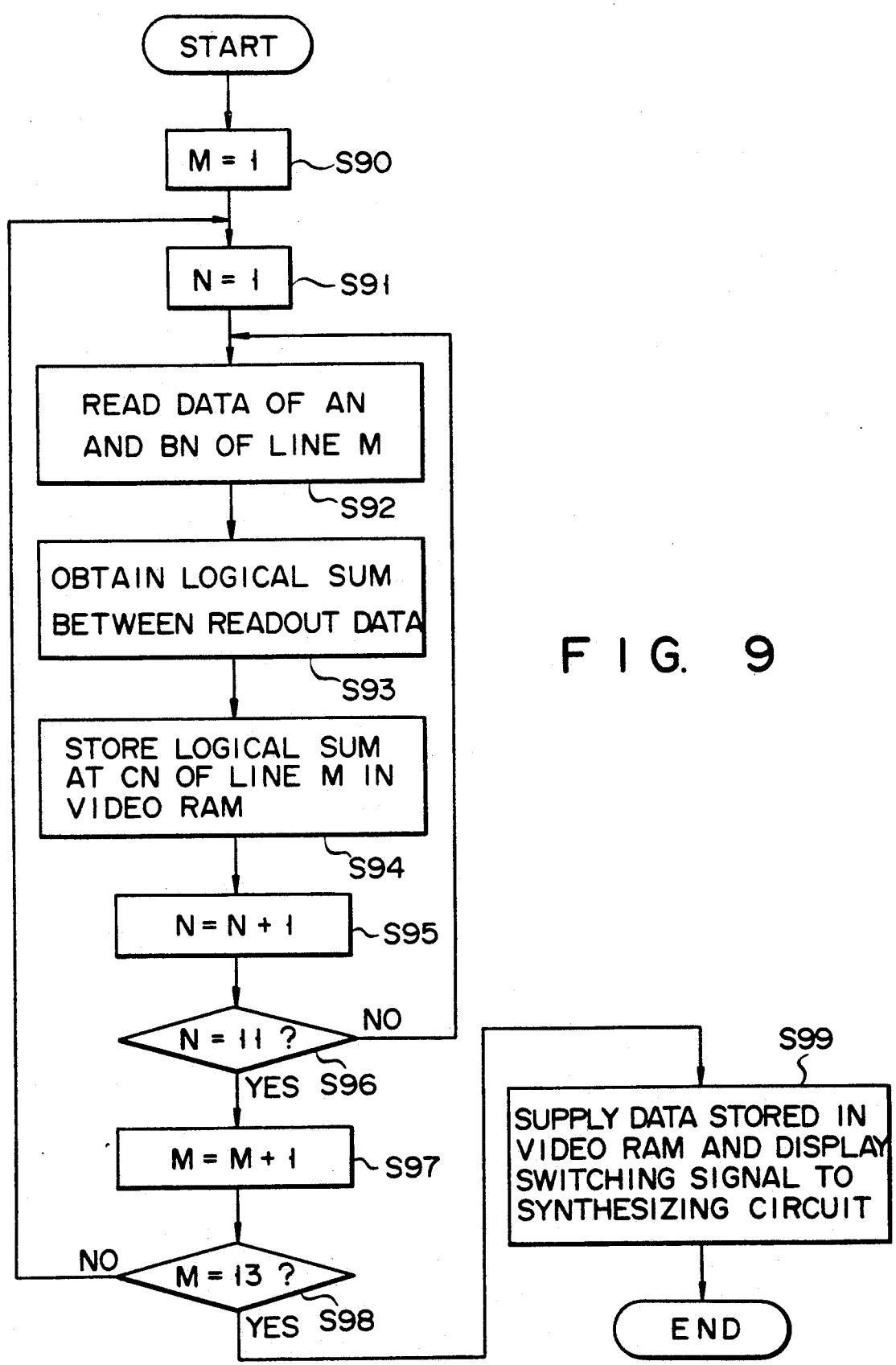
FIG. 9 is a flow chart for explaining the compression method shown in FIGS. 8A and 8B.

FIG. 9 is a flow chart according to which the third compression method is carried out. This flow chart is applicable to the case where data displayed on a TV screen having twelve lines and twenty picture elements aligned in the horizontal direction as is shown in FIG. 8A is compressed to data displayed on a screen having twelve lines and ten picture elements aligned in the horizontal direction as is shown in FIG. 8B.

Referring to the flow chart shown in FIG. 9, CPU 20 initializes M and N counters by setting "1" to them (steps S90 and S91). The M and N counters may be either hardware ones or software ones. In accordance with the values of the counters, CPU 20 reads the data of picture elements AN and BN of line M from the teletext broadcast data stored in work RAM 26 (step S92), and obtains the logical sum between the read data (step S93). The data on the logical sum is supplied to display controller 30, together with the data on the values of the M and N counters. On the basis of the values of the M and N counters, display controller 30 stores the logical sum data at picture element CN of line M of video RAM 34 (step S94).

Next, CPU 20 increases the value of the N counter with an increment of one (step S95), and then determines whether or not the value of the N counter is smaller than "11" (step S96). If the value is determined to be lower than "11", then the flow returns to step S92, so as to read the next pair of picture elements. If the value is determined to have reached "11", then the value of the M counter is increased with an increment of one (step S97). Next, it is determined whether or not the value of the M counter is smaller than "13" (step S98). If the value of the M counter is determined to be smaller than "13", then the flow returns to step S91, so as to read the first two picture elements of the next line. However, if the value of the M counter is determined to have reached "13", then CPU 20 considers the compression processings to have been completed, and supplies a control signal representing to that effect to display controller 30.

In response to the control signal, display controller 30 supplies both the compressed teletext broadcast data stored in video RAM and the appropriate display switching signal to synthesizing circuit 36 (step S99). As a result, a compressed auxiliary screen image is displayed in part of the TV picture on the display screen of CRT 40 as is shown in FIG. 8B.

As can be understood from FIG. 8B, the data on each character is not lost after the above compression.

As explained above with reference to FIGS. 8A, 8B and 9, the screen is compressed into a screen whose size is half that of the original screen in the vertical direction. Therefore, auxiliary screen data adapted for display in the ¼-sized screen can be prepared by using the third compression method in conjunction with the second compression method wherein the fields of data are switched for display, as explained above with reference to FIGS. 5A-5C, 6, and 7A-7B. More specifically, the compressed teletext broadcast data for display stored in video RAM 34 is transferred further into work RAM 26, and is processed according to the flow charts shown in FIGS. 6, 7A, and 7B.

Figure 10:
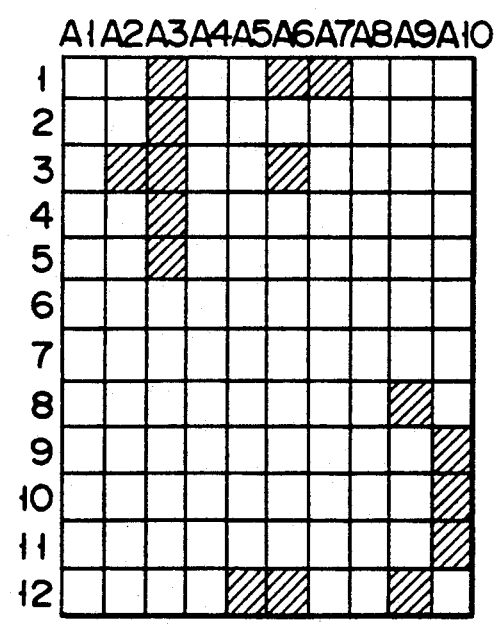
FIG. 10 shows the display condition obtained when the screen shown in FIG. 8A is compressed by the first data compression method.

In the first compression method explained with reference to FIGS. 4A and 4B, odd-numbered picture element rows B1-B10 are all deleted. As can be understood from FIG. 10, therefore, the data on each character is lost to a certain extent after the compression method. Therefore, the third compression method is preferable to the first compression method.

As mentioned above, the TV receiver of the present invention, having a teletext receiving function, uses the above compression methods and thereby enable teletext broadcast data (teletext picture) to b displayed on the TV display screen (TV picture) as auxiliary screen information, without substantially losing the data on each character.

What is claimed is:

1. Television receiver capable of receiving and displaying teletext data, comprising:

signal receiving means for receiving a television broadcast signal including teletext data;

television picture information pickup means for extracting television picture information from the television broadcast signal received by said signal receiving means;

display means for displaying the television picture information picked up by said television picture information pickup means;

teletext data pickup means for extracting the teletext data from the television broadcast signal received by said signal receiving means;

storing means for temporarily storing the teletext data picked up by said teletext data pickup means;

compression means for selectively compressing the teletext data stored in said storing means, said compression means including first compressing means for compressing the teletext data stored in said storing means by using a logical sum between two picture elements horizontally adjacent on the display screen of said display means as a single picture element; and display control means for replacing part of the television picture information displayed on said display means with the teletext data compressed by said compression means, whereby the teletext data is displayed on said display means as an auxiliary screen image, together with the television picture information.

2. The television receiver according to claim 1, wherein:

said teletext data is to be displayed in an interlace manner and includes first field image data and second field image data;

said compression means further includes:
second compressing means for compressing said teletext data compressed by said first compressing means by deleting only said second field image data; and
third compressing means for compressing said teletext data compressed by said first compressing means by deleting only said first field image data; and
said display control means displays in a non-interlaced manner, during a first-field display period, said teletext data compressed by said second compressing means as said auxiliary screen image and said display control means displays in a non-interlaced manner, during a second-field display period, said teletext data compressed by said third compressing means as said auxiliary screen image.

3. A method for superimposing a teletext picture on a television picture, comprising the steps of:
receiving a television broadcast signal including teletext data;
extracting television picture information from a received television broadcast signal;
displaying a television picture corresponding to the television picture information;
extracting the teletext data from the received television broadcast signal;
temporarily storing the teletext data;
compressing a stored teletext data by selective deletion, said compressing step including a first step of compressing the stored teletext data by using a logical sum between two picture elements horizontally adjacent on the television picture as a single picture element; and
superimposing a teletext picture corresponding to a compressed teletext data on the television picture by replacing part of the television picture with the teletext picture.

4. The method according to claim 3, wherein:
said teletext data includes first field image data and second field image data;
said compression step further includes the steps of:
second compressing said stored teletext data compressed in said first compressing step, by deleting only said second field image data; and
third compressing said stored teletext data compressed in said first compressing step, by deleting only said first field image data; and
said superimposing step includes the steps of displaying in a non-interlaced manner on said part of said television picture, during a first-field display period, said teletext data compressed by said second step and displaying in a non-interlaced manner on said part of said television picture, during a second-field display period, said teletext data compressed by said third step.

5. A television receiver capable of receiving and displaying teletext data, comprising:
signal receiving means for receiving a television broadcast signal including teletext data;
television picture information pickup means for extracting television picture information from said television broadcast signal received by said signal receiving means;
display means for displaying said television picture information extracted by said television picture information pickup means;
teletext data pickup means for extracting said teletext data from said television broadcast signal received by said signal receiving means, said teletext data to be displayed in an interlace manner and including first field image data and second field image data;
storing means for temporarily storing said teletext data extracted by said teletext data pickup means;
compression means for selectively compressing said teletext data stored in said storing means, said compression means including:
first compressing means for compressing said teletext data, which is stored in said storing means, by deleting only said second field image data, and
second compressing means for compressing said teletext data, which is stored in said storing means, by deleting only said first field image data; and
display control means for replacing part of said television picture information displayed on said display means with said teletext data compressed by said compression means, said teletext data being displayed on said display means as an auxiliary screen image together with said television picture information, said display control means including means for displaying, in a non-interlaced manner on part of said display means, said teletext data compressed by said first compressing means during a first-field display period and by said second compressing means during a second-field display period.

6. A method for superimposing a teletext picture on a television picture, comprising the steps of:

receiving a television broadcast signal including teletext data;

picking up television picture information from a received television broadcast signal;

displaying a television picture corresponding to said television picture information;

picking up said teletext data from said received television broadcast signal, said teletext data to be displayed in an interlace manner and including first field image data and second field image data;

temporarily storing said teletext data;

compressing a stored teletext data by selective deletion, said compressing step including:

first compressing said stored teletext data by deleting said second field image data, and second compressing said stored teletext data by deleting said first field image data; and superimposing a teletext picture corresponding to a compressed teletext data on said television picture by replacing part of said television picture with said teletext picture, said superimposing step including a step of displaying, in a non-interlaced manner on part of said television picture, said teletext data compressed by said first compressing step during a first-field display period and said teletext data compressed by said second compressing step during a second-field display period.

* * * * *